United States Patent
Tsukui et al.

(10) Patent No.: US 10,259,680 B2
(45) Date of Patent: Apr. 16, 2019

(54) CABLE SYSTEM (71) Applicant: Topy Kogyo Kabushiki Kaisha, Shinagawa-ku, Tokyo (JP)

(72) Inventors: Shingo Tsukui, Tokyo (JP); Seiji Oomura, Tokyo (JP); Hidekazu Iwaki, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 398 days.

(21) Appl. No.: 14/890,499

(22) PCT Filed: Jun. 26, 2014

(86) PCT No.: PCT/JP2014/066997
§ 371 (c)(1),
(2) Date: Nov. 11, 2015

(87) PCT Pub. No.: WO2015/198452
PCT Pub. Date: Dec. 30, 2015

(65) Prior Publication Data
US 2016/0176676 A1    Jun. 23, 2016

(51) Int. Cl.
*B65H 75/42* (2006.01)
*B65H 75/44* (2006.01)
(Continued)

(52) U.S. Cl.
CPC .......... *B65H 75/42* (2013.01); *B65H 75/425* (2013.01); *B65H 75/4484* (2013.01);
(Continued)

(58) Field of Classification Search
CPC .... B65H 75/42; B65H 75/4484; B65H 75/00; B65H 75/38; B65H 75/40; B65H 79/00; H02G 11/02; H02G 11/00; H02G 11/006
(Continued)

(56) References Cited

U.S. PATENT DOCUMENTS

| 4,066,141 A | 1/1978 | Elvin |
| 4,666,102 A | 5/1987 | Colbaugh et al. |
(Continued)

FOREIGN PATENT DOCUMENTS

| JP | 58188255 A | 11/1983 |
| JP | 2004-91111 A | 3/2004 |
(Continued)

OTHER PUBLICATIONS

International Search Report from corresponding International Application No. PCT/JP2014/066997 dated Jun. 26, 2014.
(Continued)

*Primary Examiner* — William E Dondero
*Assistant Examiner* — Mark K Buse
(74) *Attorney, Agent, or Firm* — Thomas B. Ryan, Patent Agent; Harter Secrest & Emery LLP (57) ABSTRACT

A cable system A includes a cable 3 for connecting a base device 1 and a travelling body 2, a reel device 10 mounted on the travelling body 2, a motor controller 40 for controlling a motor 15 of the reel device 10, and a rotary encoder 16 (rotation sensor) for detecting rotation of a reel 12. The motor controller 40 basically makes the motor 15 free, when the reel 12 is rotating in an unreeling direction, and basically applies a rotational torque in a reeling direction to the reel 12, when the reel 12 is rotating in the reeling direction. Furthermore, even if the reel 12 is rotating in the unreeling direction, if an unreeling speed of the cable 3 exceeds a travelling speed of the travelling body 2, the rotational torque in the reeling direction is applied to the reel 12. Slackening of the cable 3 is thereby prevented.

4 Claims, 5 Drawing Sheets

(51) Int. Cl.
*H02G 11/00* (2006.01)
*H02G 11/02* (2006.01)

(52) U.S. Cl.
CPC ......... *B65H 75/4486* (2013.01); *H02G 11/00* (2013.01); *H02G 11/02* (2013.01); *B65H 2701/32* (2013.01)

(58) Field of Classification Search
USPC ...................................................... 242/390.9
See application file for complete search history.

(56) References Cited

U.S. PATENT DOCUMENTS

| | | | |
|---|---|---|---|
| 7,615,937 B2 | 11/2009 | Mishima | |
| 9,577,418 B2* | 2/2017 | Tsukui | H02G 11/02 |
| 2015/0028146 A1* | 1/2015 | Tsukui | H02G 11/02 |
| | | | 242/390.9 |

FOREIGN PATENT DOCUMENTS

| | | |
|---|---|---|
| JP | 2008-254927 | 10/2008 |
| JP | 4630908 B2 | 10/2008 |
| JP | 5426049 B1 | 2/2014 |
| JP | 5432419 B2 | 5/2015 |
| WO | 2013099912 A1 | 5/2015 |

OTHER PUBLICATIONS

International Search Report of International Searching Authority (English) for PCT/JP2014/066997 dated Sep. 30, 2014.
Written Opinion of International Searching Authority (English) for PCT/JP2014/066997 dated Sep. 30, 2014.
Extended European Search Report for corresponding European Application No. 14891126.6 dated Mar. 27, 2017.

* cited by examiner

CABLE SYSTEM

TECHNICAL FIELD

The present invention relates to a cable system equipped with a reel device.

BACKGROUND ART

It is well known to remotely control a travelling body to travel by a remote controller (base device). A video camera is mounted on the travelling body, and image signals from the video camera are transmitted to the remote controller, and an operator operates the remote controller while looking at a monitor display accompanying the remote controller. Remote control signals from the remote controller are transmitted to the travelling body to cause the travelling body to move forward or backward, or to turn.

Systems for transmitting the image signals and the remote control signals include a wireless system and a wired system. A wired system is mainly adopted when the travelling body is used in a place where radio waves are not easily received, such as in a building with winding passages or under water.

In rescue operation or exploration, the work site may be within a building, and the operator of the controller may have to perform operation from a distance of more than 100 meters, or sometimes as far as one kilometer, due to poison, radiation, explosion risk, or the like which prevents the operator from getting close to the site. In these cases, wired travelling bodies are mainly used.

In the wired system, the travelling body and the remote controller are connected by a long cable, and a signal transmission wire is embedded in the cable.

In the wired system, a reel for winding the cable is generally installed in the travelling body. This is because, if the reel is installed in a base station, the travelling body has to draw out the cable from the reel in the base station, and the burden is great.

However, in the case where the reel is mounted on the travelling body as described above, there is a problem that, because a thin long cable is wound around the reel, the cable may be slackened and be caught at a part of the travelling body or the cable may get tangled, becoming unable to transmit signals, and as a result, the travelling body may become immobilized.

Japanese Patent Nos. 4630908, 5432419 and 5426049 disclose a reel device mounted on crawler-type travelling body. The reel device includes a reel around which the cable is wound, a motor connected to the reel, a rotary encoder (rotation sensor) for detecting rotation of the reel, and a motor controller.

According to the disclosures of the three referenced Japanese patents, the motor controller basically controls the motor in the following manner.

When the travelling body is moving (forward) in the direction away from the remote controller (base station), and the rotary encoder is outputting a pulse signal indicating rotation in the unreeling direction of the reel, the motor is made free, allowing the cable to be smoothly unreeled from the reel device, thereby preventing the cable from becoming too tense as to obstruct the forward travelling of the travelling body.

Also, when the travelling body is moving (backward) in the direction of getting closer to the remote controller, the motor is driven to reel the cable onto the reel, and the cable is prevented from being slackened.

However, the basic control as described above alone may cause an inconvenience. For example, when the travelling body is moving forward, the motor is freed and the cable is unreeled. In this state, if the travelling body suddenly stops, the reel keeps rotating due to inertia, and the cable is unreeled more than necessary and is slackened.

Accordingly, in Japanese Patent No. 4630908, an accelerometer for detecting the acceleration in the forward/backward direction is installed in the travelling body, and when the travelling body suddenly stops while moving forward, the cable is reeled by the motor controller driving the motor and causing the reel to rotate in the reeling direction, in response to the acceleration in the backward direction detected by the accelerometer.

Moreover, the basic control as described above alone may also cause inconveniences as follows. For example, after the travelling body completes climbing up stairs, the front side of the travelling body is suddenly pulled downward by gravity, and the attitude is suddenly changed from an inclined attitude to a horizontal attitude. At this time, due to the sudden change in the attitude of the travelling body, the reel is pulled by the cable and is rotated at a great speed, and the cable is unreeled at a great speed. The reel keeps rotating at a great speed due to inertia after the landing of the travelling body. As a result, the cable is slackened, and this slackened portion may get entangled with the reel rotating in the unreeling direction, or may be spread near the reel in a disorderly manner, or may get caught at a part of the travelling body, thereby immobilizing the travelling body and preventing it from returning.

Accordingly, in Japanese Patent Nos. 5432419 and 5426049, an accelerometer for detecting acceleration in the vertical direction is installed in the travelling body, and when the attitude of the travelling body is suddenly changed, the motor controller drives the motor and rotates the reel in the reeling direction in response to acceleration information from the accelerometer to thereby reel the cable.

SUMMARY OF INVENTION

Technical Problem

In Japanese Patent Nos. 4630908, 5432419, and 5426049, an accelerometer is used to control a reel motor for preventing slackening of the cable, but depending on the acceleration information may cause the following inconveniences.

Output of the accelerometer is an analog signal and is susceptible to noise, and requires an averaging process or the like, and thus the response speed is reduced.

When the traveling body receives acceleration in the forward/backward direction or the vertical direction due to impact or vibration during travelling of the travelling body on uneven ground, this may be erroneously determined as a sudden stop, completion of climbing up or start of climbing down of stairs of the travelling body, and reeling control for the reel may be performed. To prevent such erroneous determination, complex control software is additionally needed.

Additionally, in Japanese Patent Nos. 5432419 and 5426049, cable unreeling speed and travelling body speed are compared, as in the present application. However, according to Japanese Patent Nos. 5432419 and 5426049, only motor brake is applied when the cable unreeling speed exceeds the travelling body speed, and reeling control is not performed as in the present application.

Solution to Problem

The present invention is made to solve the problems described above. The present invention provides a cable system comprising:

a) a cable for connecting a base device and a travelling body, and for at least transmitting a signal;

b) a reel device mounted on the travelling body, the reel device including a reel for reeling the cable, a motor for driving the reel, and a rotation sensor for outputting information about rotation of the reel;

c) a speed sensor for outputting information about a travelling speed of the travelling body; and d) a motor controller for controlling the motor of the reel device, wherein the motor controller judges a rotational direction of the reel based on the information from the rotation sensor, and when the judgement is made that the reel is rotating in a direction of unreeling the cable, the motor controller basically makes the motor free, and when the judgement is made that the reel is rotating in a direction of reeling the cable, the motor controller basically drives the motor to apply a rotational torque in the reeling direction to the reel, and wherein, even in a state where the reel is rotating in the unreeling direction, if an unreeling speed of the cable from the reel based on the output information from the rotation sensor exceeds the travelling speed of the travelling body based on the information from the speed sensor, the motor controller drives the motor to apply the rotational torque in the reeling direction to the reel.

In the cable system having the features described above, the reel may be controlled according to the travelling state of the travelling body to eliminate a slack in the cable, and the travelling body may be allowed to travel stably. Also, since reel control is performed without using an accelerometer, response speed is increased, and inadvertent cable reeling control based on erroneous detection due to vibration, impact or the like may be reliably avoided. There is no need for complex control software for preventing erroneous detection.

Preferably, the rotation sensor comprises a rotary encoder for outputting pulse signals at each predetermined angular rotation of the reel, wherein the motor controller judges the rotational direction of the reel based on the pulse signals from the rotary encoder, and also calculates an integrated encoder value so that the number of pulses is added to the integrated encoder value when the reel is rotating in the reeling direction and the number of pulses is subtracted from the integrated encoder value when the reel is rotating in the unreeling direction, and wherein the motor controller calculates the unreeling speed of the cable based on the integrated encoder value and the pulse signals from the rotary encoder per unit time.

In the cable system having the features described above, by using the integrated encoder value, the cable unreeling speed may be accurately calculated according to the state of reeling of the cable on the reel, and more accurate cable slack prevention control may be performed. Since the state of reeling of the cable may be obtained based on the pulse signals from the rotary encoder, a separate detector is not necessary and the cost of the cable system may be reduced.

According to one embodiment, the motor controller calculates, based on the integrated encoder value, a diameter or a perimeter of one turn of the cable at an outermost position of the cable wound around the reel, calculates a rotational speed of the reel in the unreeling direction based on the pulse signals per unit time from the rotary encoder, and calculates the unreeling speed of the cable based on the diameter or the perimeter of the one turn of the cable and the rotational speed of the reel.

According to another embodiment, wherein the motor controller stores data indicating a relationship between the integrated encoder value and a length of the cable wound around the reel, calculates an amount of change in a cable length per unit time corresponding to a change in the integrated encoder value per unit time based on the pulse signals per unit time from the rotary encoder and the stored data, the amount of change in the cable length per unit time being provided as the unreeling speed of the cable.

Advantageous Effects of Invention

According to the cable system of present invention, a slack in the cable may be reliably and swiftly removed by simple information processing.

DESCRIPTION OF EMBODIMENTS

Figure 1:
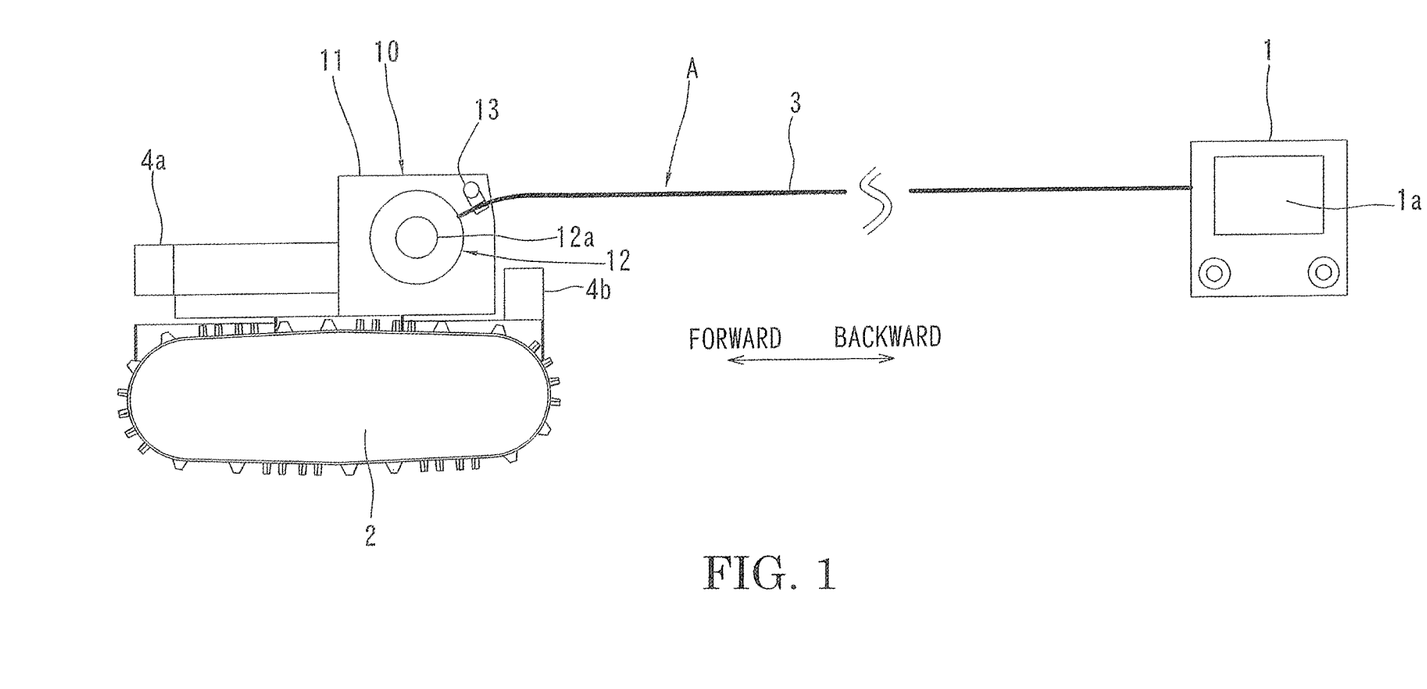
FIG. 1 is a schematic side view of an exploration system provided with a cable system according to an embodiment of the present invention.

Hereinafter, an exploration system including a cable system A according to an embodiment of the present invention will be described with reference to the drawings. As shown in FIG. 1, the exploration system includes a remote controller 1 (base device), a crawler-type travelling body 2, and a long cable 3 for connecting the remote controller 1 and the travelling body 2.

The remote controller 1 includes a monitor display 1a. The travelling body 2 includes a battery (not shown) and a motor for travelling. The cable 3 has optical fibers embedded therein, and transmits signals.

Video cameras 4a and 4b (exploration devices) are mounted on the travelling body 2. The video camera 4a takes images of the view ahead of the travelling body 2, and the video 4b captures the view behind the travelling body 2. As the exploration device, a sensor such as an infrared sensor, a chemical detection sensor, a temperature sensor, or a radiation sensor may be used together with or instead of the video cameras.

An operator operates the remote controller 1 while looking at the image from the video camera 4a when the travelling body 2 is moving forward, and at the image from the video camera 4b when the travelling body 2 is moving backward, and controls a motor for moving the travelling body 2, to thereby perform remote operation of forward travelling, backward travelling or turning of the travelling body 2.

The cable system A includes the cable 3 mentioned above, and a reel device 10 for reeling or unreeling the cable 3. The reel device 10 is mounted on a rear portion of the travelling body 2, for example, and includes a pair of supports 11 fixed to a top surface of the travelling body 2, a reel 12 rotatably supported by the supports 11, and an alignment mechanism 13. An axis of the reel 12 extends horizontally perpendicular to forward/backward direction of the travelling body 2.

The alignment mechanism 13 is supported by the pair of supports 11 at near the reel 12, and moves the cable 3 in the axial direction of the reel 12 according to the rotation of the reel 12, and reverses the movement direction of the cable 3 when a terminal point of the movement range is reached, and by repeating this movement, causes the cable 3 to be approximately evenly wound around a body 12a of the reel 12 in the axial direction.

One end of the cable 3 is connected to a converter that is built in the remote controller 1. The converter converts optical signals from the cable 3 to the remote controller 1 into electrical signals, and converts electrical signals from the remote controller 1 to the cable 3 into optical signals.

As described above, the cable 3 is wound around the body 12a of the reel 12 via the alignment mechanism 13 of the reel device 10, and the other end of the cable 3 is connected to a rotary joint (not shown) disposed at the reel 12, and is further connected to electrical signal wires of a plurality of systems via a converter and a hub.

The electrical signal wires of the plurality of systems are provided for transmitting control signals to a motor driver of the motor for moving of the travelling body 2, and for transmitting image signals (exploration signals) from the video cameras 4a and 4b, for example. Conversion between optical signals and electrical signals is also performed by the converter of the reel device 10.

Figure 2:
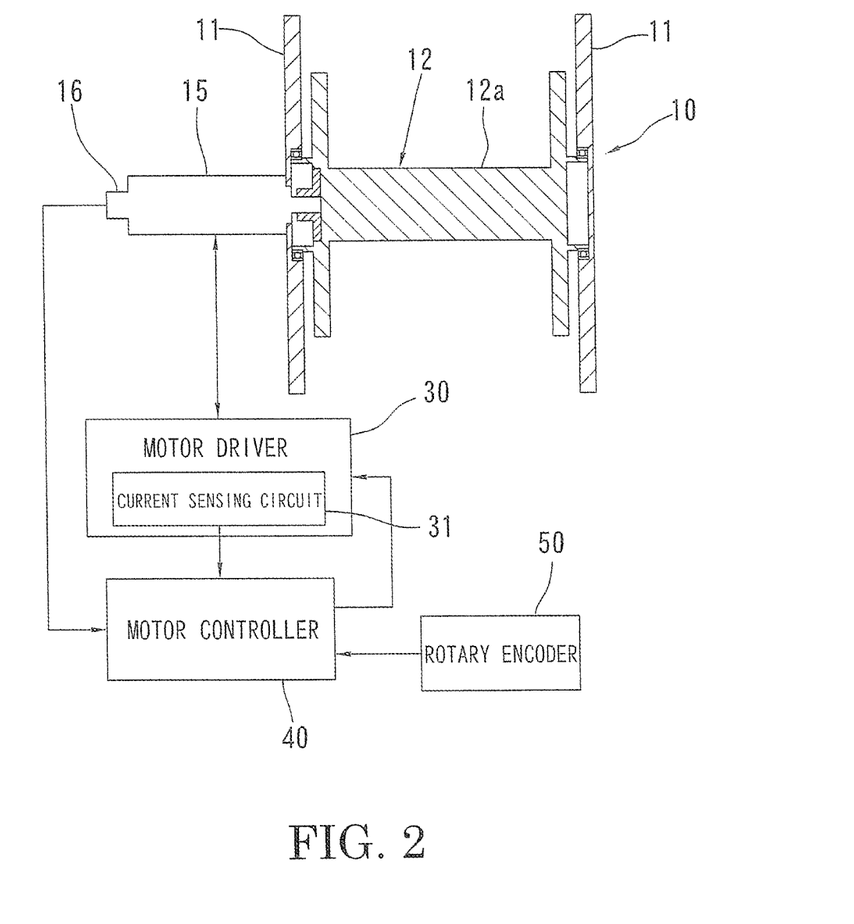
FIG. 2 is a cross-sectional plan view of a reel device of the cable system, and additionally shows, as blocks, a configuration for controlling a motor of the reel device.

As shown in FIG. 2, the reel device 10 includes a reel motor 15, and a rotary encoder 16 (rotation sensor).

The motor 15 is a DC motor with brush, for example, and is fixed to a side wall of the support 11 and connected to the reel 12 via a built-in gear train.

At the time of rotation of the motor 15 (and the reel 12), the rotary encoder 16 outputs a pulse signal at each predetermined angular rotation of the reel 12. As is well known, a pulse signal includes two pulses with different phases, and the rotational direction of the reel 12 may be identified by the phase difference between the two signals.

As shown in FIG. 2, the cable system A further includes a motor driver 30, and a motor controller 40 including a microprocessor and the like.

The motor driver 30 includes a drive circuit for supplying a drive current to the motor 15, and also a current sensing circuit 31 for sensing a current flowing through a coil of the motor 15.

The motor controller 40 controls the motor 15 by transmitting control signals to the motor driver 30 based on information from the rotary encoder 16, the current sensing circuit 31, and a rotary encoder 50 (speed sensor) for detecting rotation of a sprocket of the travelling body 2.

Figure 3:
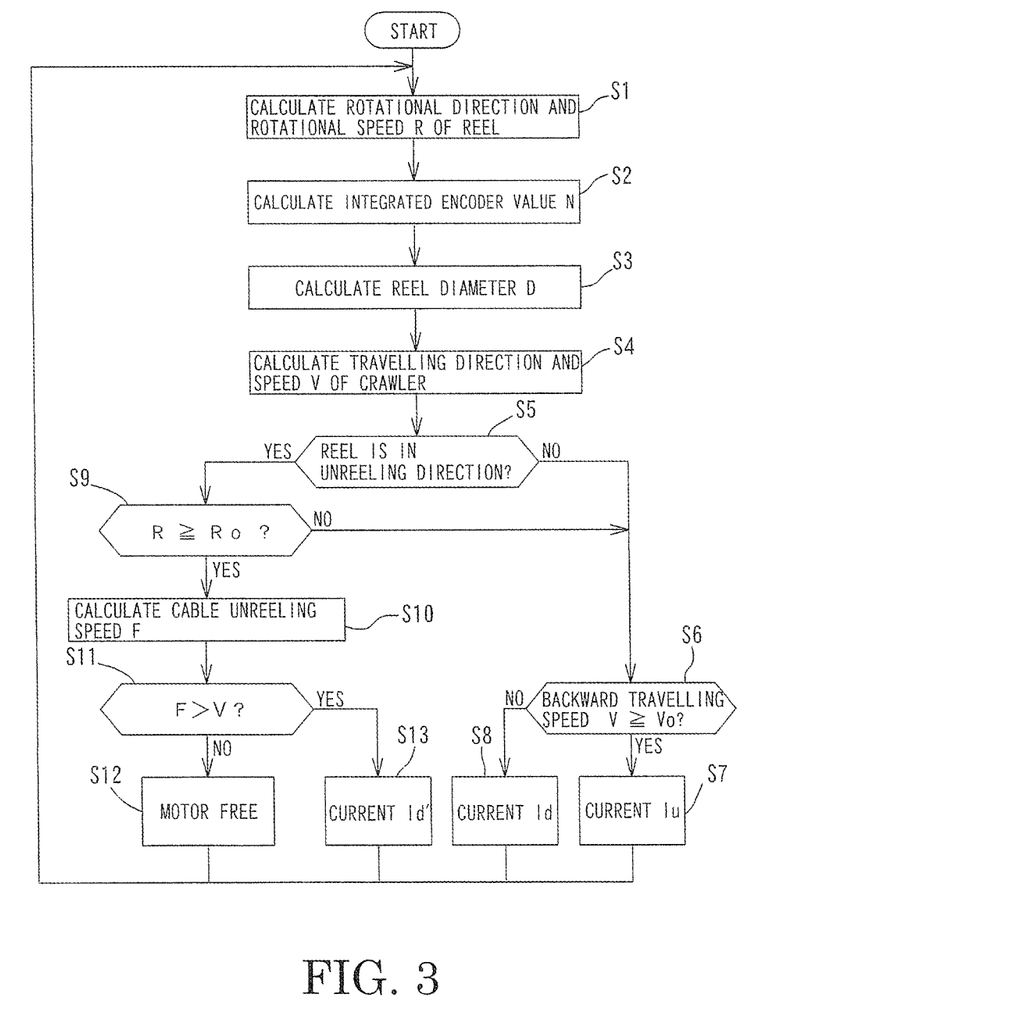
FIG. 3 is a flow chart for controlling the motor of the reel device.

In the following, control of the motor 15 by the motor controller 40 will be described with reference to the flow chart in FIG. 3.

In step S1, the rotational direction and the rotational speed R of the reel 12 are calculated based on the pulse signals from the rotary encoder 16. As described above, the rotational direction may be detected based on the phase difference of the pulse signals. The rotational speed R may be calculated based on the number of pulses output from the rotary encoder 16 per unit time.

In step S2, an integrated encoder value N of the rotary encoder 16 is calculated. The integrated encoder value N is set zero when the cable 3 is not wound around the body 12a of the reel 12. The number of pulses of the rotary encoder 16 is added to the integrated encoder value N when the reel 12 is rotating in the reeling direction. The number of pulses of the rotary encoder 16 is subtracted from the integrated encoder value N when the reel 12 is rotating in the unreeling direction.

Figure 4:
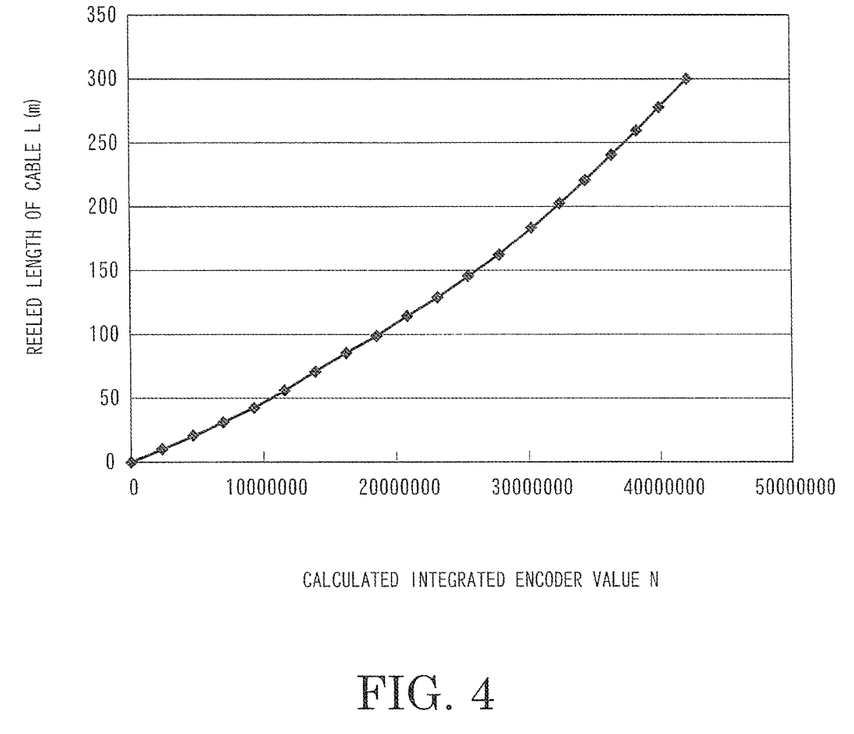
FIG. 4 is a diagram showing the relationship between an integrated encoder value that is obtained by counting the pulses from a rotary encoder of the reel device and a reeled length of a cable.

The integrated encoder value N includes information about the reeled state of the cable 3 around the reel 12. For example, as shown in FIG. 4, the integrated encoder value N includes information about a length L of the reeled cable 3. The integrated encoder value N and the reeled length L of the cable 3 are not in proportional relation. The gradient is increased as the integrated encoder value N is increased. This is because the length of the cable 3 that is wound by one rotation of the reel 12 increases as the total length of the wound cable 3 is increases.

The integrated encoder value N includes information about a reel diameter D as the reeled state of the cable 3. The reel diameter D indicates the diameter of one turn of the cable 3 at the outermost position of the cable 3 wound around the reel 12. The integrated encoder value N and the reel diameter D are in approximately proportional relation, and may be determined by the following formula.

$$D = D_0 + k \cdot N \quad (1)$$

Here, $D_0$ is the diameter of the body 12a of the reel 12 in a state where the cable 3 is not wound around, and k is a constant. The constant k is determined by the diameter of the cable 3 and the number of turns of the cable 3 aligned by the alignment mechanism 13, for example.

Likewise, the integrated encoder value N includes information about the reel perimeter. The reel perimeter indicates the perimeter around one turn of the cable 3 at the outermost position of the cable 3 wound around the reel 12. The integrated encoder value N and the reel perimeter are in approximately proportional relation.

In step S3, the reel diameter D is calculated. The reel diameter D may be determined by the formula (1) based on the integrated encoder value N, or may be determined based on measured data indicating the relationship between the integrated encoder value N and the reel diameter D. The measured data may be stored in the motor controller 40.

In step S4, travelling direction and speed V of the travelling body 2 are calculated based on the pulse signals from the rotary encoder 50.

In the next step S5, a judgement is made whether or not the rotational direction of the reel 12 is the unreeling direction. If a positive judgement is made (that is, it is judged that the reel 12 is rotating in the unreeling direction), unreeling control is basically performed by making the motor free, as will be described later. If a negative judgement is made (that is, it is judged that the reel 12 is rotating in the reeling direction or is stopped), reeling control is basically performed by driving of the motor 15.

First, the reeling control will be described in detail. If a negative judgement is made in step S5, the control proceeds to step S6 to judge whether or not travelling speed V of the travelling body 2 in the backward direction is equal to or greater than a set travelling speed $V_0$. The set travelling speed $V_0$ is an extremely low speed that is far lower than the speed of normal backward travelling. Accordingly, when the travelling body 2 is normally moving backward, a positive judgement is made in step S6, and the control proceeds to step S7. In step S7, duty control is performed on supply current to the motor 15 to apply a rotational torque in the reeling direction to the reel 12 so that a sensed current at the current sensing circuit 31 is maintained at a set current Iu. This allows the cable 3 to be reeled with a relatively large rotational torque.

If a negative judgement is made in step S6, that is, if it is judged that the travelling body 2 is moving forward, or moving in the backward direction at a speed below the set travelling speed $V_0$ (including zero speed), the control proceeds to step S8. In step S8, the supply current to the motor 15 is controlled to generate a rotational torque in the reeling direction of the reel 12 so that the sensed current at the current sensing circuit 31 is maintained at a set current Id. The set current Id is smaller than the set current Iu mentioned above. The rotational torque generated at this step is smaller than the rotational torque generated at step S7.

The basics of the unreeling control change depending on various conditions. Details are given below.

If a positive judgement is made in step S5, the control proceeds to step S9 to judge whether or not the rotational speed R of the reel 12 is equal to or greater than a set rotational speed $R_0$. The set rotational speed $R_0$ is an extremely low speed that is far lower than the rotational speed of the reel 12 during normal forward travelling of the travelling body 2. When the travelling body 2 is normally moving forward, a positive judgement is made in step S9.

If a negative determination is made in step S9 (that is, if it is judged that the reel 12 is rotating in the unreeling direction but at an extremely low speed), the reeling control of steps S6 to S8 is performed assuming that slackening of the cable 3 is caused, and thereby the slackening is prevented or removed.

If a positive judgement is made in step S9 (that is, it is judged that the reel 12 is rotating in the unreeling direction at a speed equal to or greater than the set rotational speed $R_0$), the unreeling control is basically performed. Specifically, in step S10, a speed F of unreeling of the cable 3 from the reel 12 (the length of the cable 3 that is unreeled per unit time) is calculated by the following formula using the rotational speed R of the reel 12 and the reel diameter D.

$$F=\pi D \Box R \quad (2)$$

In the next step S11, it is judged whether or not the unreeling speed F of the cable 3 is greater than a forward travelling speed V of the travelling body 2. That the unreeling speed F of the cable 3 is greater than the forward travelling speed V of the travelling body 2 means that the cable 3 is unreeled more than necessary.

If a negative judgement is made in step S11, the control proceeds to the next step S12 to perform the unreeling control by making the motor 15 free (the drive circuit of the motor driver 30 is opened to allow the reel 12 to rotate without resistance from the motor 15).

If a positive judgement is made in step S11, the control proceeds to step S13 to perform the reeling control. Here, the motor 15 is driven to thereby apply a rotational torque in the reeling direction to the reel 12 so that the sensed current is maintain at a set current Id'. The set current Id' is smaller than the set current Iu and greater than the set current Id.

A situation where a positive judgement is made in step S11 arises at a time when the attitude of the travelling body 2 is suddenly changed as in the case described below.

Figure 5A:
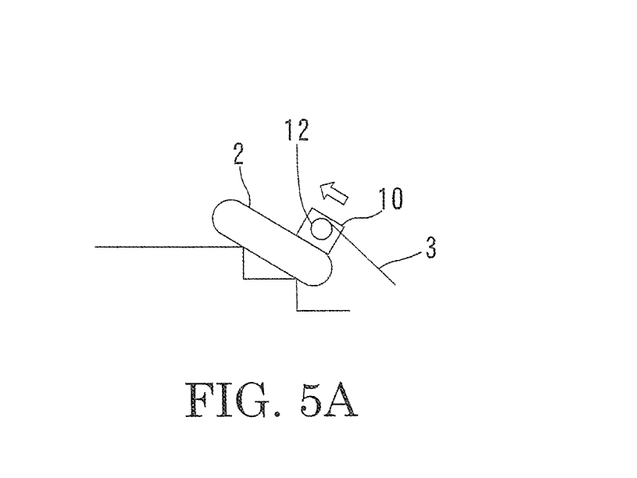
FIG. 5A is a schematic view showing a state immediately before a travelling body of the exploration system completes climbing up stairs when moving forward.
Figure 5B:
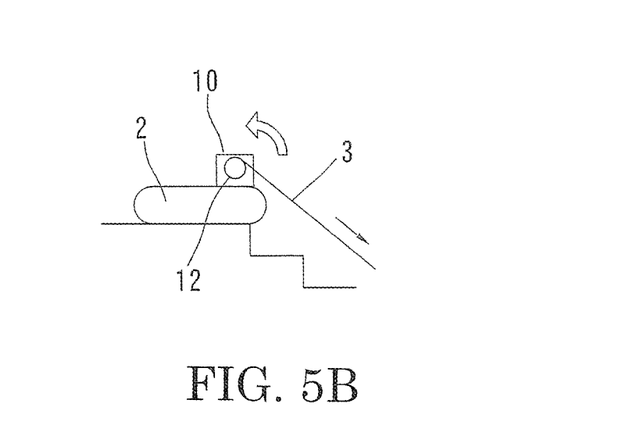
FIG. 5B is a schematic view showing a state immediately after the travelling body has climbed up the stairs and changed from an inclined attitude to a horizontal attitude.

As shown in FIG. 5A, when the travelling body 2 is climbing up stairs, the travelling body 2 is inclined. When the climbing is over, the travelling body 2 is rotated by gravity so that the front side is lowered, and the attitude of the travelling body 2 is changed to horizontal attitude shown in FIG. 5B. During the course of this sudden change in the attitude of the travelling body 2, the reel 12 is suddenly displaced upward (if the reel 12 is provided at a rear portion of the travelling body 2 as in the present embodiment), and thus the reel 12 rotates in the unreeling direction at a great speed by being pulled by the cable 3, and keeps rotating due to inertia. If the real 12 were left to rotate, the cable 3 would be slackened, and the slackened portion would get tangled or would be disorderly spread near the reel 12. However, in the present embodiment, the slack in the cable 3 may be limited and may be removed in a short time by making a positive judgement in step S11 and swiftly applying a rotational torque in the reeling direction to the reel 12 in step S13, and inconveniences such as the slackened portion of the cable 3 being spread near the reel 12 may be avoided.

Now, other situations that cause sudden change in the attitude of the travelling body 2 will be described. When the travelling body 2 starts climbing down stairs or a large step while moving forward, the travelling body 2 suddenly changes from the horizontal attitude to an inclined attitude. When the travelling body 2 finishes climbing down stairs or a large step while moving forward, the rear end of the travelling body 2 falls from the last step, and thus the travelling body 2 suddenly changes from the inclined attitude to the horizontal attitude. In these situations, as in the case described above where climbing up stairs is over, the reel 12 rotates in the unreeling direction at a great speed by being pulled by the cable 3, but the slack in the cable 3 may be removed in a short time by steps S11 and S13 as in the case described above.

A situation where a positive determination is to be made in step S11 arises also when the travelling body 2 that is moving forward is suddenly stopped, for example. The reel 12 rotates in the unreeling direction at the time of forward travelling of the travelling body 2, and keeps rotating in the unreeling direction due to inertia even when the travelling body 2 is suddenly stopped. If the real 12 were left to rotate, the cable 3 would be slackened. Also in this case, the slack in the cable 3 may be removed by steps S11 and S13.

The control according to the present invention is not limited to the embodiment described above, and various modifications may be adopted. For example, the reel perimeter may be calculated in step S3 instead of the reel diameter from the integrated encoder value, and the unreeling speed of the cable may be calculated in step S10 by multiplying the reel perimeter by the rotational speed of the reel.

Also, the motor controller may calculate the reeled length L of the cable 3 corresponding to an integrated encoder value based the measured data shown in FIG. 4 stored in the motor controller. The amount of change in the reeled length of the cable per unit time may be given as the unreeling speed of the cable.

The reel diameter or the reel perimeter may be calculated based on angle information of a contact arm contacting the reeled cable or distance information from a laser distance meter that radiates laser on the reeled cable, without using the integrated encoder value.

Moreover, the unreeling speed of the cable may be determined from only the information about the reel rotational speed without using the integrated encoder value or information from detection means for the reel diameter/ perimeter. In this case, the mean value of the reel diameter or the reel perimeter is used as a constant.

A motor controller for controlling the motor of the reel device may be provided at the base device.

The cable may include an optical fiber for transmitting signals and an electrical supply line. In this case, a power source for the travelling body and the reel device may be arranged near the base station.

The travelling body may be equipped with a plurality of wheels.

INDUSTRIAL APPLICABILITY

The present invention may be applied to a cable system that is used for controlling a travelling body such as an exploration robot.

REFERENCE SIGNS LIST

A Cable system
1 Remote controller (base device)
2 Travelling body
3 Cable
10 Reel device
12 Reel
15 Motor
16 Rotary encoder (rotation sensor)
40 Motor controller
50 Rotary encoder (speed sensor)

The invention claimed is:

1. A cable system comprising:
a) a cable for connecting a base station and a travelling body, and for at least transmitting a signal;
b) a reel device mounted on the travelling body, the reel device including a reel for reeling the cable, a motor for driving the reel, and a rotation sensor for outputting information about rotation of the reel;
c) a speed sensor for outputting information about a travelling speed of the travelling body; and
d) a motor controller for controlling the motor of the reel device,
wherein the motor controller judges a rotational direction of the reel based on the information from the rotation sensor, and when the judgement is made that the reel is rotating in a direction of unreeling the cable, the motor controller allows the motor to rotate freely, and when the judgement is made that the reel is rotating in a direction of reeling the cable, the motor controller drives the motor to apply a rotational torque in the reeling direction to the reel, and
wherein, even in a state where the reel is rotating in the unreeling direction, if an unreeling speed of the cable from the reel based on information about a reeled state of the cable around the reel and the information about a rotational speed of the reel output from the rotation sensor exceeds the travelling speed of the travelling body based on the information from the speed sensor, the motor controller drives the motor to apply the rotational torque in the reeling direction to the reel.

2. The cable system according to claim 1,
wherein the rotation sensor comprises a rotary encoder for outputting pulse signals at each predetermined angular rotation of the reel,
wherein the motor controller judges the rotational direction of the reel based on the pulse signals from the rotary encoder, and also calculates an integrated encoder value so that the number of pulses is added to the integrated encoder value when the reel is rotating in the reeling direction and the number of pulses is subtracted from the integrated encoder value when the reel is rotating in the unreeling direction, and
wherein the motor controller calculates the unreeling speed of the cable based on the integrated encoder value as the information about the reeled state of the cable around the reel and the number of the pulse signals from the rotary encoder per unit time as the information about the rotational speed of the reel.

3. The cable system according to claim 2, wherein the motor controller calculates, based on the integrated encoder value, a diameter or a perimeter of one turn of the cable at an outermost position of the cable wound around the reel, calculates a rotational speed of the reel in the unreeling direction based on the pulse signals per unit time from the rotary encoder, and calculates the unreeling speed of the cable based on the diameter or the perimeter of the one turn of the cable and the rotational speed of the reel.

4. The cable system according to claim 2, wherein the motor controller stores data indicating a relationship between the integrated encoder value and a length of the cable wound around the reel, calculates an amount of change in a cable length per unit time corresponding to a change in the integrated encoder value per unit time based on the pulse signals per unit time from the rotary encoder and the stored data, the amount of change in the cable length per unit time being provided as the unreeling speed of the cable.

* * * * *